United States Patent
Schäfer

(10) Patent No.: US 7,793,772 B2
(45) Date of Patent: Sep. 14, 2010

(54) INTELLIGENT ACCUMULATION CONVEYOR TRACK

(75) Inventor: Gerhard Schäfer, Neunkirchen (DE)

(73) Assignee: SSI Schafer Peem GmbH, Gaz (AT)

( * ) Notice: Subject to any disclaimer, the term of this patent is extended or adjusted under 35 U.S.C. 154(b) by 0 days.

(21) Appl. No.: 12/478,109

(22) Filed: Jun. 4, 2009

(65) Prior Publication Data

US 2009/0288930 A1 Nov. 26, 2009

Related U.S. Application Data

(63) Continuation of application No. PCT/EP2007/010519, filed on Dec. 4, 2007.

(30) Foreign Application Priority Data

Dec. 5, 2006 (DE) ................. 10 2006 058 893

(51) Int. Cl.
B65G 47/31 (2006.01)
B65G 43/08 (2006.01)
B65G 47/28 (2006.01)
(52) U.S. Cl. .................. 198/460.1; 198/461.1
(58) Field of Classification Search .............. 198/460.1, 198/461.1
See application file for complete search history.

(56) References Cited

U.S. PATENT DOCUMENTS 5,638,562 A * 6/1997 Masoncup ............. 5/493
5,711,410 A * 1/1998 Cai et al. ............. 198/460.1

* cited by examiner

*Primary Examiner*—Gene Crawford
*Assistant Examiner*—Kavel P Singh
(74) *Attorney, Agent, or Firm*—McNeely & Hare LLP; Kevin J. McNeely

(57) ABSTRACT

A conveyor line segment (N+1; N; N−1) with a predetermined length for accumulating several conveyed goods thereon, includes a conveying means (12) for moving the conveyed goods (A, B, C) thereon along a conveying direction (28), which is oriented parallel to a longitudinal direction of the segment (N), along the segment (N), wherein the conveying means (12) can be driven for being moved at a speed ($v_N$), which is substantially constant, a sensor (10) for detecting that a conveyed good (A, B, C) is driven onto the segment (N), and a controlling unit (20; 22) coupled to the sensor (10) in order to move and stop the conveying means dependent on the detection signal of the sensor (10), and adapted to determine a geometrical length along the conveying direction (28) of incoming conveyed goods (A, B, C), and to not move further the conveying means (28) dependent on the determined length(s), if the segment (N) cannot receive other conveyed goods (A, B, C) any longer.

25 Claims, 3 Drawing Sheets

INTELLIGENT ACCUMULATION CONVEYOR TRACK

RELATED APPLICATIONS

This is a continuation application of the co-pending international application WO 2008/067989A1 (PCT/EP2007/010519) filed on 4 Dec. 2007 and claiming priority of the German patent application DE 10 2006 058 893 filed on 5 Dec. 2006 which is fully incorporated herewith by reference.

BACKGROUND OF THE INVENTION

The present invention relates to an (intelligent) accumulation conveyor track, and a method for operating the same, in order to allow accumulation of several conveyed goods on one and the same conveyor track segment.

RELATED PRIOR ART

The term "conveyor" is to be understood hereinafter to include all technical and organizational devices for moving or transporting goods on (most times relatively short) conveyor tracks or conveyor lines. There are different types of conveyors, such as belt conveyors, roller conveyors, hanging conveyors, pulling chain conveyor and similar. Each type of conveyor may use various types of conveying means. For example, the belt conveyor may use a conveying means that includes a belt with two pulleys, one of which is driven by a motor, located at opposing ends of the conveyor. The invention, which is described in the following, is not limited to any specific type of conveyor or conveying means and may use those known in the art.

Accumulation conveyor tracks are used for buffering or accumulating conveyed goods. For this purpose, traffic of conveyed goods is stopped or interrupted. Typical examples of use for accumulation conveyor tracks are: merging or crossing of several conveyor lines, since the traffic of conveyed goods needs to be accumulated there, in order to avoid collisions or for the purpose of preference rules on one or more feeding lines; the accumulation in front of a slower location, such as a slower station or a transfer unit (for example, a lateral pusher); or the formation of trains, for example, if conveyed goods having a common target are collected on an accumulation line. This list is not complete, but only serves for the purpose of illustrating the significance and the width of the usage of accumulation conveyor tracks. An accumulation conveyor track conventionally is a short single conveyor, the length of which is marginally longer than the length of a conveyed good to be accumulated. This represents an accumulation space for a single conveyed good. An accumulation conveyor line consists of several accumulation conveyor segments being switchable independently.

An accumulation conveyor track in accordance with the prior art is described in the European patent application EP 0 959 028 A2. Another accumulation conveyor track is disclosed in JP 07-206 132 AA.

With such an accumulation conveyor track conveyed goods are kept spaced to each other within an accumulation area. A conveyed good being located at a front end is transported further after a predetermined time. Subsequently, a following conveyed good is transported with a distance.

In general, a highest possible throughput of conveyed goods for each time unit is required with conveyor systems. Particularly, the next transport of the conveyed good with conveyor systems having accumulation areas depends on the clear distance between transported conveyed goods, hence the distance between a rear edge of each frontal conveyed good being, and a front edge of the following conveyed good are to be kept as small as possible, in order to obtain a throughput as high as possible.

In the prior art, each accumulation space stops and accumulates merely one conveyed good such as a container. Inversely, this means that a plurality of accumulation spaces including associated controlling devices, sensors and actuators, have to be used, in order to allow accumulation of a corresponding plurality of conveyed goods. With a sensor being associated with the accumulation space it is typically recognized, whether a conveyed good drives onto the associated accumulation space. The sensor can be used for detecting traffic jams and positions as well. If the sensor delivers a signal during passage of a conveyed good, then the position of the conveyed good relative to the conveyor track can be determined.

SUMMARY OF THE INVENTION

Therefore, it is an object of the present invention to provide an accumulation conveyor segment which is capable of systematically accumulating several conveyed goods, and particularly introducing the accumulated conveyed goods systematically back into a traffic of conveyed goods again.

Further, it is an object of the present invention, to provide a method allowing accumulation of several conveyed goods on one and the same conveyor track segment.

This object is solved by a conveyor line segment comprising a predetermined length for accumulating several conveyed goods thereon, and which further comprises: conveying means for moving or transporting the conveyed goods thereon in a conveying direction, which is oriented parallel to a longitudinal direction of the segment, along the segment, wherein the conveying means can be driven for being moved at a speed which substantially is constant; a sensor for detecting a conveyed good driving onto the segment; and a controlling device being coupled to the sensor for moving and stopping the conveying means in dependence on the detection signal of the sensor, and which is adapted to determine a geometrical length of conveyed goods coming in along the conveying direction, and, in dependence on the determined length(s) to not move the conveying means any further, if the segment cannot receive other conveyed goods.

Also, the sensor serves, on the one hand, for determining a state at which a conveyed good is driven in onto the segment. On the other hand, the sensor can serve for determining the geometrical length of a conveyed good, which is driven on the segment. Based on the speed, by which the segment or its conveying means is typically operated, and on, for example, the temporal period of the detection signal of the sensor, the length of the incoming conveyed good can be determined. Particularly, the segment particularly has a controlling unit which is adapted to determine from this data the length of conveyed goods which are already received on the segment.

Thus, several conveyed goods can be stopped on one and the same accumulation segment, whereby the number of accumulation segments is reduced significantly, which are needed in the conveyor line. The controlling effort gets less as well, since less accumulation segments need to be coordinated for accumulating many conveyed goods.

An advantage of the invention is that several conveyed goods can be accumulated on the same segment, without requiring a separate sensor system, another drive technology or other actuators (for each accumulation space).

In accordance with a preferred embodiment the segment cannot receive other conveyed goods, if a space on the conveying means, which is still available, is no longer sufficient for receiving other conveyed goods, particularly if the space, which is still available, is smaller than a maximum length of a conveyed good.

The controlling device of the segment of the present invention can evaluate the "free" space on the conveying means based on the sensor signals, for example, by calculating in a first step the lengths of the accumulated conveyed goods on the segment, and in a second step summing the same, in order to determine in this way the space, which is still available, by creating a difference. If particularly a maximum conveying length is known, thus it can easily be determined whether the segment could still receive another conveyed good of maximal length as well.

Alternatively, a sensor information of another segment located upstream could be used in order to determine the length of an expected conveyed good. By knowing the length of the expected conveyed good, the controlling device of the segment of interest could determine whether the free space is sufficient for receiving the conveyed good being expected.

Another advantage of the invention is that several conveyed goods are accumulated with a closest distance relative to each other. If, according to the prior art, exemplarily four separate accumulation spaces were required for accumulating four conveyed goods, then, for example, now up to four conveyed goods can be accumulated on one and the same segment in accordance with the present invention—in dependence on the length of the segment—wherein the clear distance between the individual conveyed goods are significantly smaller than the distances between the four accumulation segments in accordance with the prior art. This measure also increases the throughput of conveyed goods per unit of time.

In accordance with another embodiment the controlling unit comprises a memory unit in which the movement speed of the conveying means and the length of the segment are deposited.

This data can be used for performing the corresponding calculations upon accumulating. The same applies for a maximum length of the conveyed good, which can be deposited in the memory unit as well.

Additionally, it is preferred if different types of conveyed goods can be accumulated, which can have different dimensions as well.

With the aid of a sensor signal the length of each conveyed good is individually determined so it is not necessary that the controlling unit has in advance knowledge of the dimensions of the conveyed goods to be expected, in order to allow performance of the corresponding calculations.

Very often conveyed goods also glide on the conveyor line, so that they are orientated, for example, oblique relative to the longitudinal axis of the conveyor line. For example, starting from a rectangular layout, thus the effective length of the conveyed good would become greater. If the controlling unit were to calculate based on given dimensions, disturbances could happen. However, since the controlling unit measures the actual length (along the conveying direction), conveyed goods can be transported in a manner deviating from an ideal positioning as well.

Preferably, the different dimensions (with respect to an ideal positioning) can be deposited in the memory unit as well.

As mentioned above, the geometrical length of a conveyed good can be determined by measuring the time duration of the detection signal of the sensor.

If the sensor is implemented, for example, as a light barrier, then a period of the interruption signal can be measured, which is caused if a conveyed good interrupts the beam of light when the conveyed goods pass.

In accordance with another embodiment the sensor is arranged in an area of an end of the conveying means being located upstream, i.e. at the beginning of the segment.

In this manner, it can be recognized when an incoming conveyed good arrives in the area of the segment.

For that purpose, it is advantageous, if the sensor is externally adjacent to the end of the segment, which is located upstream, preferably directly.

Thus, the point in time can be detected at which a conveyed good is to be driven onto the segment. Particularly, if belt conveyors in combination with a light scanner are used, the light scanner must be given the opportunity to emit a beam of light which, in term, has to be reflected by a passing conveyed good, in order to allow the passage of the conveyed good at all.

Additionally, it is preferred if another sensor is arranged in an area located upstream relative to the segment, wherein the area is preferably located about a distance of one length of a segment.

This upstream sensor can be used for determining the length of a conveyed good, which is to be driven onto the accumulation segment as well, with a sufficient temporal advance. If the information on the length of the conveyed good is present sufficiently early, then the controlling unit can easily determine whether or not the expected conveyed good can still be driven onto the free space. However, there are also alternative methods for determining the length of the conveyed good. Thus, for example, video cameras could be employed which record an image of the conveyor line from above, in order to evaluate subsequently the thus generated data with regard to the length of the conveyed good by using an appropriate software.

In accordance with another advantageous embodiment the controlling unit comprises a calculating unit which sums the lengths of all the conveyed goods which have already been driven onto the segment as well as a predetermined minimum distance, for determining whether the segment can take other conveyed goods.

The presently described embodiment reflects the second alternative which has been described already above, for allowing determination whether other conveyed goods can be received.

Also, a conveyor line can be assembled by accumulation segments according to the present invention, wherein the line then comprises several of these accumulation segments.

The object mentioned above is additionally solved by a method for operating a conveyor line in an accumulation mode, wherein the conveyor line comprises several, preferably arranged one behind the other, segments each of which is assigned to respectively a sensor, and wherein, in normal mode, a conveyed good can be transported on a conveying means of each segment along a conveying direction being parallel to the longitudinal direction of the respective segments at a speed being substantially constant, the method comprising the steps of: if a traffic jam condition is present in a second segment located upstream relative to a first segment, then driving at least one conveyed good onto the first segment; determining a geometrical length of the incoming conveyed good along the conveying direction; and judging whether the first segment can take other conveyed goods.

During the process of taking the decision it is particularly taken into account which length the first segment has along the conveying direction and at which speed the conveying means of the first segment is moved. Additionally, further a maximum length of the conveyed good or a length of a conveyed good coming in next can be taken into account.

The controlling unit can calculate based on this information, whether the "free" space being still available on the segment is sufficient for receiving the next conveyed good. Since the length of the accumulation segment typically is longer than the length of a conveyed good, thus several conveyed goods can be accumulated on one and the same accumulation segment.

Additionally, it is advantageous, if no further conveyed goods are fed, if a difference between the length of the first segment and a sum of all determined lengths of the incoming conveyed goods is beneath a threshold length, particularly beneath a maximum conveyed good length. Additionally, due to this threshold length, it is possible to accumulate on individual segments a different number of identical conveyed goods (for example 3 conveyed goods on segment N, 2 conveyed goods on segment N−1, wherein the type of conveyed good remains the same).

It is to be mentioned that the lengths of the conveyed goods as well as the lengths of the segments can be different. The threshold length can depend on the length of the segment.

Further, it is preferred when the length of incoming conveyed goods is determined based on the temporal duration of a sensor signal, which represents a driving-in of a conveyed good.

However, as mentioned above, the length can be determined in another manner as well.

In accordance with another advantageous embodiment, the conveying means is respectively stopped, if the conveyed good is fed, and subsequently driven again, if another conveyed good is to be fed and it was decided that other conveyed goods can be received.

By this stepwise operation of the conveying means, such as a rotary belt of a conveyor belt, several conveyed goods can be accumulated with a very tight distance one behind the other on the accumulation segment. Thereby, the clear distance between the conveyed goods is decreased, whereby the throughput per unit of time can be increased. Defined gaps between the conveyed goods can be obtained by backlash, which can be set.

BRIEF DESCRIPTION OF THE DRAWINGS

It is clear that the above mentioned and hereinafter still to be explained features cannot only be used in the respectively given combination but also in other combinations or alone, without departing from the scope of the present invention.

Embodiments of the invention are depicted in the drawings and will be explained in more detail in the following description.

PREFERRED EMBODIMENTS OF THE INVENTION

Figure 1:
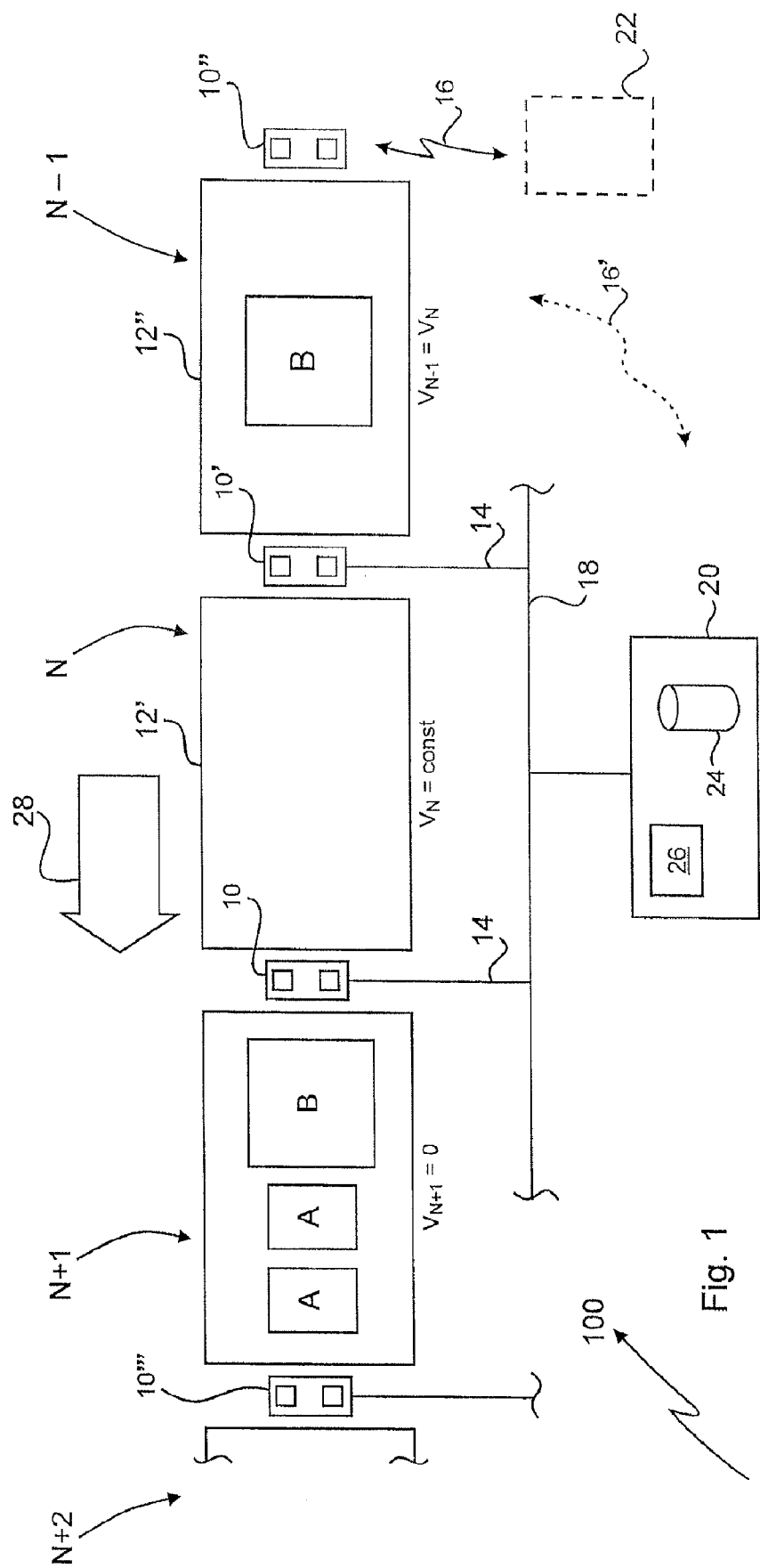
FIG. 1 shows a schematic top view of an accumulation conveyor track which is formed of several accumulation segments in accordance with the present invention.

FIG. 1 shows a top view of an accumulation conveyor track 100, wherein three accumulation segments N+1, N, N−1 in terms of endlessly rotating belt conveyors are exemplarily shown. It is clear that the accumulation conveyor track can be formed of more or less accumulation segments. Further it is clear that the usage of a belt conveyor as an accumulation segment is merely one example. For example, belt-driven roller segments could be used as well.

Each accumulation segment comprises an assigned sensor 10, 10', 10" and a conveying means 12, 12', 12". The sensors 10 are preferably connected via lines 14 and, for example, a data bus 18 to at least one controlling unit 20 such as a PLC (Programmable Logic Controller). It is clear that each segment could be connected to an appropriate controlling unit 20, as it is indicated exemplarily for the segment N−1, the sensor 10" of which is connected to a controlling unit 22 through a wireless connection 16. Alternatively, several segments share one single controlling unit. The controlling unit 22 is depicted in FIG. 1 by a broken line for clarifying that the segment N−1 could also be connected to the controlling unit 20—also either via the bus 18 or another wireless connection 16'.

Each of the controlling units 20 comprises preferably a memory unit 24 and a microcontroller (calculating unit) 26. However, the memory could be arranged externally as well, and coupled to the memory unit through a data line.

In FIG. 1 conveyed goods A, B are exemplarily conveyed from the right to the left, as indicated by a conveying direction 28.

The segment N+1 is completely occupied since it has already received two conveyed goods A and one conveyed good B. The speed $v_{N+1}$ of the segment N+1 is zero, since a traffic jam condition is present downstream, i.e. in a left hand area of FIG. 1 being not depicted, so that the articles of the segment N+1 can not be transported further along the conveying direction 28. The belt conveyor segment N is operated at a constant speed $V_N$. The speed $V_N$ is the transport speed being set for this conveyor line, which is substantially constant. In the following acceleration and deceleration effects are not considered, which actually were to be taken into account upon decelerating or accelerating the conveying means 12 of the individual segments. An expert will take these effects into account, for example, in terms of dead times. For the sake of a simple description these effects, however, will not be considered.

The segment N is empty, i.e. there are no conveyed goods thereon. The segment N−1 in turn conveys presently a conveyed good B, namely at the same speed at which the segment N is operated as well. Thus, we have the typical situation that a traffic jam has formed at the segment N+1. This means that the individual conveyed good B has to be stopped on the segment N, in order not to drive onto the conveyed goods located on the segment N+1.

With the aid of the sensor 10 it can be recognized that a conveyed good is to be driven onto an associated segment. The sensor 10 can exemplarily be a light scanner or light barrier.

In the present case, belt conveyors are used, thus the sensors 10 can always be arranged at an upstream located end of the conveying means 12, namely outside of the conveying means. With other conveyor types such as if rollers are used, the sensors, of course, could be arranged also within the area of the conveying means, for example within an air gap between two rollers. In this case, the sensor 10' of the segment N could be shifted, for example, into the end area of the conveying means 12" of the segment N−1, for allowing a still earlier recognition of whether an incoming conveyed good approaches the segment of interest. Particularly, if motor rollers are used, inertia effects are to be considered which, for example, can occur at an immediate deceleration of the rollers with the conveyed goods, i.e. the conveyed goods glide on the rollers due to the inertia.

It is clear that dependent on the used conveyor type the position or relative arrangement of the sensors 10 of an associated segment can be, or must be, changed.

As a rule, the conveying means 12 is connected to, preferably one single, drive unit. If a belt conveyor is to be used as conveying means, thus one or both deflection rollers are driven. If a belt-driven roller segment is to be used as conveying means, thus one role is driven which, in turn, drives the other idler rollers by means of the belt. Then, the rollers are driven as a group. The conveying means of the present invention is preferably moved as a whole. A conveyor segment which can be divided into further sub-segments, which then, in turn, can be respectively controlled in a separate manner, does not form part of the invention. As an example it is referred to an accumulation line in this context, which is formed of a plurality of individually controllable motor rollers as exemplarily disclosed in JP 07-206 132 AA.

Referring to FIGS. 2A to 2G, now the temporal sequence of an accumulation process is described, wherein the FIGS. 2A to 2G represent states at subsequent times.

Here, five segments N+2, N+1, N, N−1 and N−2 are exemplarily and schematically shown. All segments preferably comprise the same length along the conveying direction 28, and are depicted in terms of rectangles. Rectangles being depicted beneath each other in FIG. 2 always represent one and the same segment. The sensors 10 between the individual segments are not depicted for the purpose of simplification. The same applies with respect to the controlling unit (20, 22).

FIG. 2A shows a state in which the segment N+1 is completely occupied by two conveyed goods A and one conveyed good B. For a specific reason, these conveyed goods of the segment N+1 cannot be transported any further, since, for example, another traffic jam condition is present downstream. Therefore, the speed is $v_{N+1}=0$.

Three segments located further downstream, i.e. at the segment N−2, an individual conveyed good A is transported towards the traffic jam at the segment N+1.

With reference to FIG. 2B, the conveyed good A of the element N−2 (of FIG. 2A) has already been transported further downstream by one segment. Thus, the conveyed good A is located on the segment N−1. The conveyed good A is followed by a conveyed good C on the segment N−2.

Figure 2:
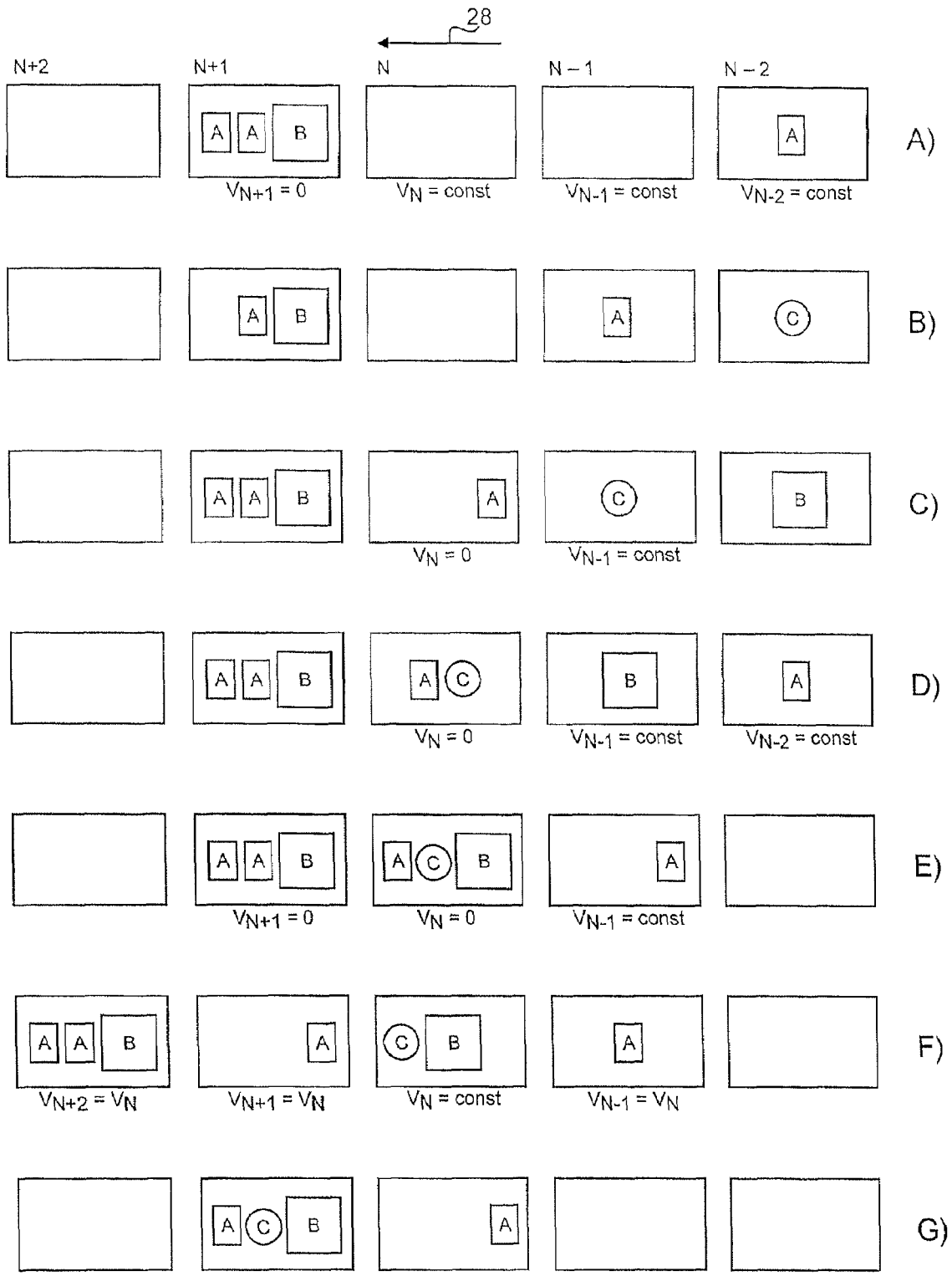
FIG. 2A-2G show an accumulation process in temporally sequenced order.

FIG. 2 shows a situation where the conveyed good A is given to the segment N. The speed $v_N$ of the segment N is zero, since the sensor (not depicted here) of the segment N has output a signal indicating that the conveyed good A has now been driven completely onto the belt of the segment N. If, for example, a light barrier is used, then the beam of light is interrupted upon driving-in. As soon as the conveyed good has been completely driven onto the segment N, the light barrier "sees" the beam again, which causes the control (not depicted neither) of the segment N to stop the belt of the segment N.

In the meantime, the conveyed good C has moved onto the segment N−1. The conveyed good C is followed, at the distance of one segment, by a conveyed good B. The conveyed good B is shown on the segment N−2 in FIG. 2C.

FIG. 2D shows the situation where the conveyed good C has also been driven onto the segment N. The sensor of the segment N now registers the driving-in of the conveyed good C. The length of the conveyed good C already can be determined in advance, for example, at the sensor of the segment N−1 by measuring the temporal duration of the interruption and calculating back to the length based on the constant speed of transportation.

In this moment, when the conveyed good C interrupts the light barrier of the segment N, the belt of the segment N, in turn, is moved at the constant speed of transportation until the conveyed good C is completely put onto the segment N. Subsequently, the speed is reduced to zero again.

In FIG. 2D the conveyed good B following the conveyed good C has already travelled onto the segment N−1. This conveyed good B is again followed by a conveyed good A which is deposited on the segment N−2.

FIG. 2E shows the situation where the conveyed good B is driven onto the segment as well. Since the control of the segment N knows the length of the segment and the sum of all lengths of the conveyed goods A, C and B it can be determined that any additional conveyed goods can be received. It can now be signalled to the control of the segment N−2 that a traffic jam is present at the segment N as well, so that the segment N−1 now also starts to accumulate conveyed goods.

FIG. 2F shows the situation where the segment N+1 has received an enabling signal indicating that the conveyed goods stopped on the segment N+1 can now be transported upstream. At a small temporal delay the conveyed goods A, C and B of the segment N can then be transported as well.

In FIG. 2F this is clarified in that the conveyed good A of this group has already been transported onto the segment N+1, densely followed by the conveyed goods C and B which are still located on the segment N.

The conveyed good A of the segment N−1 is moved as well, namely simultaneously starting with the group of the segment located downstream. This is also called a block withdrawal ("Blockabzug").

The block withdrawal can be recognized well in FIG. 2G, where the two groups have the same distance relative to each other like in FIG. 2E.

It is clear that with the present invention the conveyed goods do not always need to be oriented identically relative to the conveyor line. If a twist occurs—and thus an enlargement of the effective length along the conveying direction 28—then the controlling device can take this into account off hand, if the length is determined by means of the sensors. Further, the dimensions of the conveyed goods can already be stored in advance in the memory units. In this context, a maximum length of a conveyed good can be of particular interest.

The controlling unit can judge, due to the knowledge of the maximum length, whether the free space still available on the segment is sufficient for allowing even the reception of the longest conveyed good. If a corresponding check results in that the free space is not sufficient for allowing the receipt of the longest conveyed good, then the controlling unit can decide that any additional conveyed goods can be accumulated on this segment, and that the next segment located upstream must be used for accumulation. In this case it is not required that information is delivered to the controlling unit of the downstream located accumulation segment from another sensor being located remotely upstream. The decision, whether another conveyed good can be received, now is only dependent on the question whether the biggest or longest conveyed good can still be received.

Figure 3:
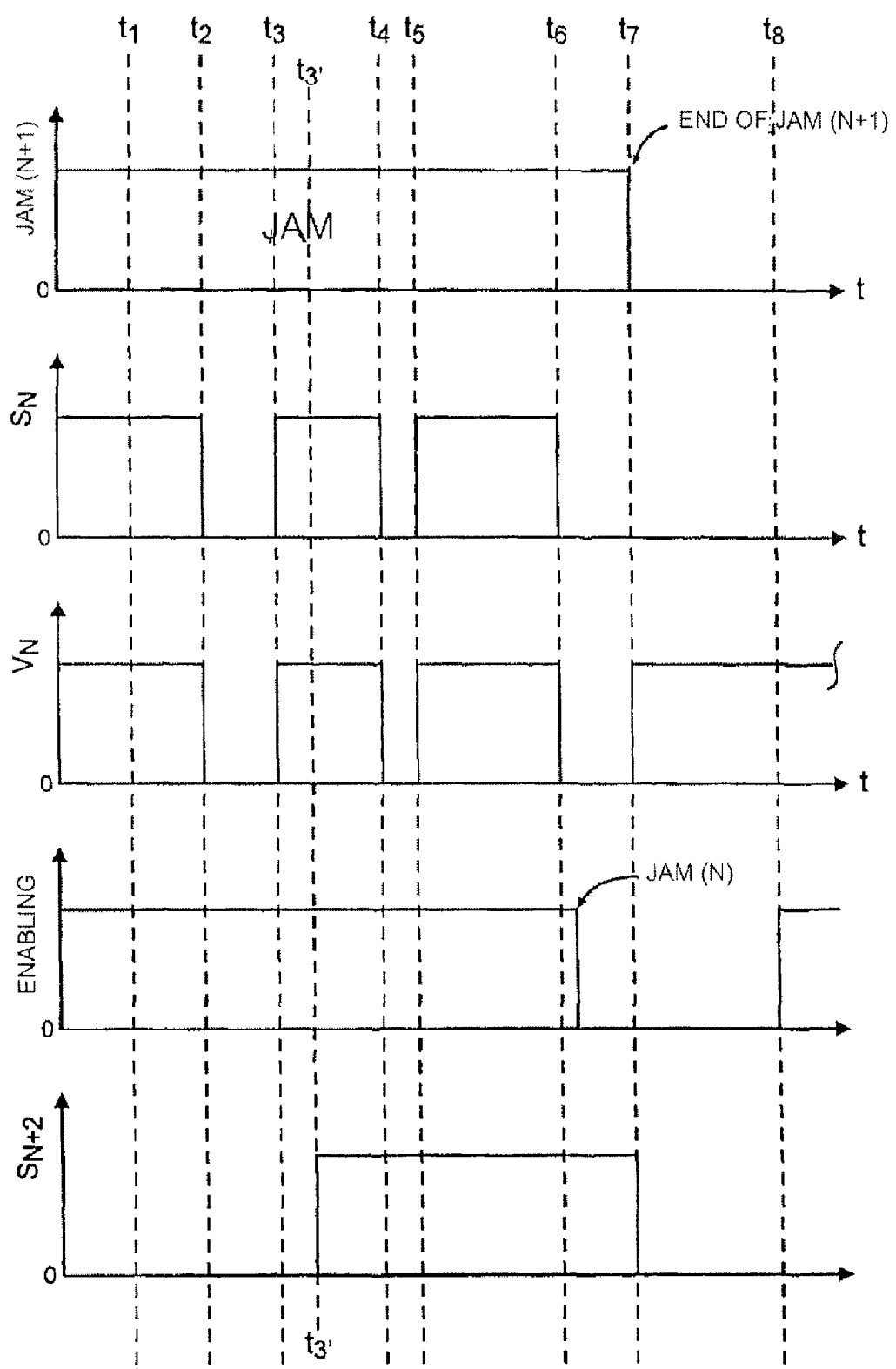
FIG. 3 shows signal-to-time diagrams which will be relevant when performing the method of the present invention.

FIG. 3 shows several signal-to-time diagrams depicted one above the other.

In an upper most diagram a logical signal is illustrated which indicates a traffic jam condition of a, preferably next, segment being located downstream. Here, it is referred to FIG. 2 as far as the segment N+1 had a traffic jam as well, wherein the segment N is the segment of interest.

The second diagram shows the signal of the sensor of the segment N, wherein the signal has a maximum value if the corresponding sensor is passed by a conveyed good.

The third diagram shows the speed at which the conveying means of the segment N is moved.

The fourth diagram shows the enabling signal being relevant for the segment N, wherein a traffic jam is present at the segment N, if the signal has a zero intensity.

The fifth diagram shows the signal of the sensor of the segment N+1.

The accumulation process of the group of the conveyed goods A, C and B on the segment N (cf. FIG. 2A-2G) will be described once again in the following. At a time $t_1$, the sensor of the segment N detects that a conveyed good is driven onto the segment N. The transportation speed of the segment N is maintained. There is not traffic jam at the segment N so that the enabling signal is positive. The traffic jam at the segment N+1 has not been resolved yet, i.e. the conveyed goods on the segment N+1 have not yet passed the sensor of the segment N+2. Accumulation is needed at the segment N.

The conveyed good A has been transported onto the segment N (cf. FIG. 2C) at the time $t_2$. In this context, the time span $t_2$-$t_1$ corresponds to the length of the conveyed good A along the conveying direction 28.

The speed of the segment N is now reduced to zero, since the segment N+1 located downstream still signals the traffic jam condition.

There is still sufficient space on the segment N, so that the enabling signal is still positive.

Now, the conveyed good C drives onto the segment N at the time $t_3$, i.e. the sensor of the segment N delivers a signal.

Therefore, the transport speed of the segment N is increased to $v_N$ again (which is here shown in an ideal manner in terms of a rectangular rising edge).

The conveyed good C has passed the sensor of the segment N at the time $t_4$. The conveyed good C is thus located completely on the segment N (cf. FIG. 2D). Therefore, the speed of the segment N is reduced to zero again. However, there is still sufficient space for receiving other conveyed goods, and therefore the enabling signal is still positive.

Now, the conveyed good B drives in at the time $t_5$. At the time $t_6$, the conveyed good B has been driven completely onto the segment N (cf. FIG. 2E).

Now, it is switched to the traffic jam condition at the segment N with a short delay, which is caused due to the interruption time, by dropping the signal strength of the enabling signal to zero.

By deviating from the sequence of the FIG. 2A to 2G it would now be possible that the traffic jam begins to resolve at the segment N+1 at the time $t_3$,. Therefore, the sensor of the segment N+2 detects the withdrawal of the group of conveyed goods which was located on the segment N+1 beforehand. This withdrawal lasts, for example, until the time $t_7$. After the withdrawal is completed, the logical signal of the segment N+1 drops to zero, which is illustrated in the first diagram of FIG. 3. This in turn means to the segment N that this segment can now begin with the withdrawal of the conveyed goods being accumulated thereon as well, and therefore the speed $v_N$ is increased again to the normal value thereof.

Alternatively, a so-called "block withdrawal" could be performed. In this context it is required that the withdrawal process at the preceding segment is completely terminated. Also, the segment N can immediately begin with the withdrawal after the start of the segment N+1.

All the conveyed goods are withdrawn from the segment N at the time $t_8$, which can be monitored, for example, with the signal of the sensor of the segment N+1, and therefore the enabling signal of the segment N jumps to its positive value again. Now, the segment N is once again capable of being used as an accumulation segment again.

It is clear that different kinds of withdrawal or traffic jam resolution can be implemented. Further, it is clear that dead times have to be taken into account and that the rising edges being depicted here are shown in an ideal manner.

Therefore, I claim:

1. A conveyor line segment having a predetermined length for accumulating several conveyed goods thereon comprising:

a conveying means for moving the conveyed goods thereon at a substantially constant speed along the segment in a conveying direction oriented parallel to a longitudinal direction of the segment;

a sensor to detect conveyed goods transported onto the segment; and a controlling unit coupled to the sensor in order to move and stop the conveying means, dependent on the detection signal of the sensor, and which is adapted to determine a geometrical length of incoming conveyed goods in the conveying direction, and to not move the conveying means further, dependent on the respectively determined length, if the segment cannot take additional conveyed goods any more, wherein the controlling unit comprises a calculation unit which sums the lengths of all the conveyed goods conveyed onto the segment and a predetermined minimum distance in order to determine whether the segment can receive other conveyed goods.

2. The conveyor line segment of claim 1, wherein the conveying means is one of a belt and a belt-driver roller segment.

3. The conveyor line segment of claim 1, wherein the segment comprises only one drive technology.

4. The segment of claim 1, wherein the segment cannot take additional conveyed goods if a still available space on the conveying means is not sufficient for receiving another of the conveyed goods.

5. The segment of claim 4, wherein the segment cannot take additional conveyed goods if the still available space is smaller than a maximum length of any of the conveyed goods.

6. The segment of claim 1, wherein the controlling unit comprises a memory unit to deposit information about the movement speed of the conveying means and the length of the segment.

7. The segment of claim 6, wherein a maximum length of one of the conveyed goods is deposited in the memory unit.

8. The segment of claim 1, wherein different types of conveyed goods having different dimensions can be accumulated on the segment.

9. The segment of claim 8, wherein the different dimensions are deposited in a memory unit.

10. The segment of claim 1, wherein the determination of the geometric length happens within a temporal duration of the detection signal.

11. The segment of claim 1, wherein the sensor is positioned at an upstream-located end of the conveying means.

12. The segment of claim 11, wherein the sensor is positioned to externally adjoin the upstream-located end of the segment.

13. The segment of claim 12, wherein the upstream-located end directly adjoins the sensor.

14. The segment of claim 1, wherein a second sensor is positioned upstream relative to the segment.

15. The segment of claim 14, wherein the second sensor is located at a remote position about a length of one segment from the upstream end of the segment.

16. An accumulation conveyor line having a plurality of conveyor line segments, each of the segments comprising:

a conveying means for moving the conveyed goods thereon at a substantially constant speed along the segment in a conveying direction oriented parallel to a longitudinal direction of the segment;

a sensor to detect conveyed goods transported onto the segment; and a controlling unit coupled to the sensor in order to move and stop the conveying means, dependent on the detection signal of the sensor, and which is adapted to determine a geometrical length of incoming conveyed goods in the conveying direction, and to not move the conveying means further, dependent on the respectively determined length, if the segment cannot take additional conveyed goods any more, wherein the controlling unit comprises a calculation unit which sums the lengths of all the conveyed goods conveyed onto the segment and a predetermined minimum distance in order to determine whether the segment can receive other conveyed goods.

17. A method for operating a conveyor line in an accumulation mode, wherein the conveyor line comprises more than one segment, each of which is assigned to a sensor, and wherein conveyed goods are transported in a normal mode on a conveying means of each segment in a conveying direction parallel to a longitudinal direction of each segment at a substantially constant speed, the method comprising:

driving at least one of the conveyed goods onto a first segment if a traffic jam condition is present at a second segment located downstream relative to the first segment;

determining a geometric length of the incoming conveyed goods along the conveying direction;

judging whether the first segment can receive other conveyed goods; and stopping the conveying means if a difference between a length of the first segment and a sum of all determined lengths of the incoming conveyed goods is beneath a threshold length.

18. The method of claim 17, wherein the method further comprises:

arranging each segment one behind the other;

moving the conveyed goods on a conveying means driven at a substantially constant speed along the segment in a conveying direction oriented parallel to a longitudinal direction of the segment;

detecting conveyed goods transported onto the segment; and stopping further comprises stopping the conveying means with a controlling unit coupled to the sensor, dependent on the detection signal of the sensor, and which is adapted to determine a geometric length of incoming conveyed goods in the conveying direction, and to not move the conveying means further, dependent on the respectively determined length, if the segment cannot take additional conveyed goods any more.

19. The method of claim 17, wherein the judging includes judging whether the first segment can receive other conveyed goods by taking into account a length of the first segment in the conveying direction and a speed of the conveying means of the first segment.

20. The method of claim 19, wherein the judging further includes judging whether the first segment can receive other conveyed goods by taking into account one of a maximum length of one of the conveyed goods and a length of a next incoming conveyed good.

21. The method of claim 17, wherein stopping further includes stopping the conveying means if the difference is beneath a maximum length of a conveyed good.

22. The method of claim 17, further comprising:

detecting conveyed goods transported onto the segment;

wherein determining includes determining a length of an incoming conveyed good during a period of temporal duration to the detection of the conveyed good.

23. The method of claim 17, wherein stopping includes stopping the conveying means of the first segment if a conveyed good is fed, and further comprising:

restarting the conveying means of the first segment if another conveyed good can be received.

24. A conveyor line segment to accumulate conveyed goods thereon, the segment comprising:

a conveying means for moving the conveyed goods in a conveying direction; and a controlling unit to determine geometrical lengths in the conveying direction of conveyed goods moved onto the segment, to sum the determined lengths and a predetermined minimum distance to determine whether the segment can receive other conveyed goods, and to control the conveying means according to the sum.

25. A method of operating a plurality of conveyor line segments of an accumulation conveyor line, the method comprising:

driving conveyed goods onto a first segment having a length using a conveying means if a traffic jam condition is present at a second segment located downstream relative to the first segment;

determining geometric lengths of the driven conveyed goods along the conveying direction; and stopping the conveying means if a difference between the length of the first segment and a sum of the determined lengths of the conveyed goods is beneath a threshold or if the difference is beneath a maximum length of one of the conveyed goods.

* * * * *